United States Patent [19]

Lee

[11] Patent Number: 5,690,879
[45] Date of Patent: Nov. 25, 1997

[54] METHOD FOR INJECTION MOLDING A GOLF CLUB BODY

[75] Inventor: Dennis Lee, Lake Zurich, Ill.

[73] Assignee: Solid Golf, Inc., St. Charles, Ill.

[21] Appl. No.: 506,830

[22] Filed: Jul. 25, 1995

[51] Int. Cl.$^6$ ............................................. B29C 45/73
[52] U.S. Cl. ............... 264/237; 264/328.16; 264/331.18; 264/334
[58] Field of Search ......................... 264/237, 328.16, 264/331.18, 334

[56] References Cited

U.S. PATENT DOCUMENTS

| | | |
|---|---|---|
| Re. 16,808 | 10/1927 | Heller . |
| D. 192,515 | 4/1962 | Henrich . |
| D. 318,891 | 8/1991 | Duclos . |
| 3,043,596 | 7/1962 | Ehmke . |
| 3,640,534 | 2/1972 | Mills . |
| 3,836,153 | 9/1974 | Dance, Jr. . |
| 3,873,094 | 3/1975 | Sebo et al. . |
| 3,989,861 | 11/1976 | Rasmussen . |
| 4,065,133 | 12/1977 | Gordos . |
| 4,113,678 | 9/1978 | Minagawa et al. . |
| 4,326,716 | 4/1982 | LaCoste . |
| 4,369,974 | 1/1983 | Komperda . |
| 4,568,088 | 2/1986 | Kurahashi . |
| 4,611,810 | 9/1986 | Kamata et al. . |
| 4,688,801 | 8/1987 | Reiter . |
| 4,704,328 | 11/1987 | Imao et al. . |
| 4,968,038 | 11/1990 | Yamada . |
| 5,093,162 | 3/1992 | Fenton et al. . |
| 5,106,094 | 4/1992 | Desboiles et al. . |
| 5,131,986 | 7/1992 | Harada et al. . |
| 5,158,289 | 10/1992 | Okumoto et al. . |
| 5,467,989 | 11/1995 | Good et al. .............................. 473/305 |

*Primary Examiner*—Leo B. Tentoni
*Attorney, Agent, or Firm*—Hill, Steadman & Simpson

[57] ABSTRACT

A golf club head has a golf club body which consists entirely and exclusively of a solid, unitary mass of polymethylmethacrylate (acrylic), the head being completed by a metal insert in the body which receives the end of the club shaft. The acrylic body is made by an injection molding process. The acrylic charge can be unadulterated, for producing a completely clear club body, or can be provided with a dye so that the club body can be given any desired color, while still remaining transparent. In addition to anesthetically pleasing appearance, since the club body is made out of a solid mass of material, a cleaner transfer of energy occurs from the club shaft to the face of the club head which strikes the golf ball, thereby producing a longer and more accurate drive.

16 Claims, 2 Drawing Sheets

METHOD FOR INJECTION MOLDING A GOLF CLUB BODY

BACKGROUND OF THE INVENTION

1. Field of the Invention

The present invention is directed to a composition for, and a method for manufacturing, a golf club head, such as a driver head.

2. Description of the Prior Art

Conventional golf club driver heads consist of composite materials. So-called wood drivers actually consist of a number of different materials, including a portion of the club body consisting of wood, in addition to a plastic face, a metal heel plate, and shot weight in the center of the wooden portion. Metal clubs are hollow in the center and thus contain air therein.

The weight and volume of the materials which are used to produce a driver head, or any golf club head, must be calculated so that the swing weight of the club which is produced is correct for that club. This is conventionally done by adding or subtracting mass from the golf club head.

Examples of such golf club head consisting of a number of different materials, or a single composite material, are described in U.S. Pat. Nos. 5,106,094, 4,568,088 and 3,640,534.

A putter is disclosed in U.S. Pat. No. 3,873,094 which has a part of the club body which can consist of methylmethacrylate, or another suitable plastic material, but has weights molded therein so that the body is not exclusively composed of methylmethacrylate. A golf club having a head portion consisting primarily of wood, and being provided with an insert providing a striking face for the golf ball is disclosed in U.S. Pat. No. 3,836,153. The insert consists of a molded piece prepared by curing a suspension of polymerized polymethylmethacrylate powder, which can include a few percent of a butadine styrene copolymer, in a liquid consisting essentially of methylmethacrylate and glycolmethacrylate.

Clubs having a head portion with a bushing or sleeve which receives the end of the club shaft, and reinforces the portion of the club head around the shaft, are disclosed in U.S. Pat. Nos. 3,640,534 and Re. 16,808. Golf club heads having various ridges and depressions formed in the outer surface of the club head are disclosed in U.S. Pat. Nos. Des. 318,891 and Des. 192,515.

SUMMARY OF THE INVENTION

It is an object of the present invention to provide a golf club head which improves the transfer of energy from the shaft to the club face when striking a golf ball.

It is a further object of the present invention to provide such a golf club head which has a unique and aesthetically pleasing appearance.

It is a further object of the present invention to provide a method for making such a golf club head.

The above objects are achieved in accordance with the principles of the present invention in a golf club head having a club body which consists entirely of polymethylmethacrylate (acrylic). The club body is formed by an injection molding process, so that the resulting club body consists only of one piece. Since the body consists of a single mass of material, there is a cleaner transfer of energy from the club shaft to the striking face on the club body when swinging the club to strike a golf ball.

Moreover, by making the club body out of polymethylmethacrylate, the club body can be made completely clear, if no additives are added to the polymethylmethacrylate charge, thereby providing the club with a unique appearance. If desired, however, the polymethylmethacrylate charge can be provided with a dye additive, so as to lend the club body any desired color. Even though having a color, however, the club body may still remain transparent, although it will not be "clear" in the sense of having no color at all, or it may be made opaque or translucent.

The club body can be provided with a metallic insert as part of the molding process, the insert receiving the end of the club shaft and reinforcing the club body in the region immediately surrounding the shaft. This also permits the club head to be made separately from the shaft, and later attached by inserting the shaft into the insert or bushing.

As used herein, the term "club head" means the entirety of the portion of the golf club which is attached to the club shaft, and thus includes the metal insert or bushing. The term "club body" means the portion of the club head which is injection molded out of polymethylmethacrylate, and thus excludes the insert. The "club body" therefore is composed entirely and exclusively of polymethylmethacrylate, whereas the "club head" consists of the club body plus the metal insert.

DESCRIPTION OF THE PREFERRED EMBODIMENTS

Figure 2:
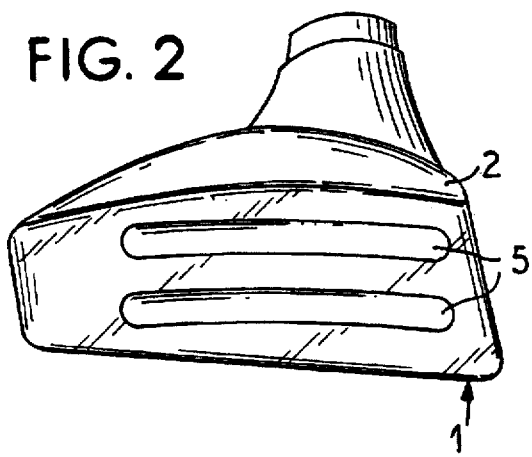
FIG. 2 is an end elevational view of the club head of FIG. 1.
Figure 1:
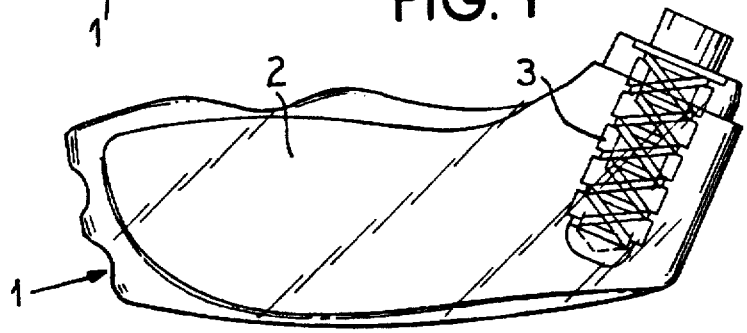
FIG. 1 is a front elevational view of a club head constructed and manufactured in accordance with the principles of the present invention.

A club head 1 constructed in accordance with the principles of the present invention is shown in various views in FIGS. 1 through 4. The club head 1 is composed of a club body 2, which consists entirely and exclusively of polymethylmethacrylate (acrylic), and a metallic insert 3, which is adapted to securely receive and hold the end of a club shaft (not shown). The insert 3 may consist, for example, of aluminum. As indicated by the shading, the club head 2 is transparent, which as used herein means optically transmissive for normal sunlight. In one embodiment, if no additives are added to the polymethylmethacrylate, the club head will be completely clear, i.e., it will have no color. Suitable dyes can be added to the polymethylmethacrylate charge prior to conducting the injection molding of the club body 2, however, so that the club body 2 can be given any desired color, so that it may remain transparent to light, in accordance with the above definition, or may be made opaque or translucent.

As can also be seen in FIGS. 1 through 4, the club body 2 can be provided with one or more depressions or "speed slots." For example, the top of the club body 2 can be provided with speed slots 4, the end face can be provided with speed slots 5, and the bottom of the club body 2 can be provided with a speed slot 6, formed by a depression therein.

The club head 1, consisting of the club body 2 and the insert 3, can have a total weight, for example, of 208 grams and a maximum thickness of approximately 1.7".

Heretofore, injection molding of a mass of acrylic material of the size comprising the club body 2 (i.e., 200 grams or more and a thickness of approximately 1.7") has not been successfully accomplished without bubbles or defects to the extent necessary to withstand the forces to which such a mass is subjected when striking a golf ball (i.e., a solid mass). The absence of bubbles and other defects is also necessary in order to obtain the necessary clean transfer of energy from the club shaft through the club body to the golf ball. Because the thickness of the club body is larger than polymethylmethacrylate molded products which are currently produced, a processing method as disclosed herein must be utilized in order to control volumetric shrinkage and warpage. The possibilities for such volumetric shrinkage and warpage to occur is present both during and after the injection molding process. The following conditions specifically contribute to volumetric shrinkage and warpage of any large volume injection molded product, and are overcome by the method disclosed herein for producing a club body consisting entirely and exclusively of polymethylmethacrylate.

A non-uniform pressure distribution is created when material is injected into the cavity of the mold at a rate and temperature which permits a larger volume of material in one section of the cavity, and lesser volume in another. This will produce a temperature differential which produces accompanying shrinkage and warpage in the product. Due to the thickness of the product, such shrinkage and warping in the context of a golf club body would result in the creation of voids in the center of the club body 2. Shrinkage will also occur which creates wrinkles on the outer surface. The difference in heat transfer to the surrounding environment from the outside surface of the molded body to the center of the molded body must be controlled to eliminate this problem.

In order to avoid the aforementioned problems giving rise to shrinkage and warpage, the process used to make the club body 2 is as follows. The material used to form the club body 2 may be, for example, Rohm and Haas VO45 Acrylic. The injection molding press which is used to create the club body 2 from a charge of polymethylmethacrylate must be large enough to support a 12 oz. shot. A 150–200 ton machine will, for example, be sufficient. Commercially available injection molding machines include the capability of controlling a number of temperature zones in the press barrel. In an injection molding machine having four such temperature zones, the first zone is preferably set at 410° F., the second zone is preferably set at 400° F., the third zone is preferably set at 390° F., and the fourth zone (tip) is preferably set at 390° F.

The injection molding machine must also have the capability of profiling the injection. This is a known function of injection molding machines which permits an increase or decrease in the pressure needed to fill and pack the cavity at any stage of the filling process. Filling takes place in a first stage of the process. The profile for the club body head 2 will require an increase in pressure during the first stage starting at 30% pressure from 0 to 50% of fill. The profile will steadily increase to 80% pressure from 50 to 80% of fill. The final first stage pressure is 900–1,260 psi. This will reduce or eliminate the amount of shrinkage by increasing the density of the fill.

Increased second stage pressure of 900–2,000 psi is then applied to hold and pack the material in the cavity to retain the aforementioned density until gate freeze-off. The time at which this increased pressure in the second stage must be maintained should be in the range of 3 to 4 minutes, or more. A typical total cycle time will consist of a first stage injection of 15–35 seconds, a hold and pack stage lasting from 3 to 4 minutes, followed by 4 to 5 minutes of cooling time.

The club body 2 will at this point be ejected from the mold, and will immediately be placed in a secondary cooling bath of water at 180°–200° F. and/or hot oil at 180°–200° F. This secondary bath is important for controlling heat transfer during cooling of the body, because the body will be ejected from the mold with a minimum wall thickness of 0.125" to 0.1875". The center of the body part will still be molten. The secondary bath is used to prolong the extraction of heat from the body, and to stabilize the difference (gradient) in temperature from the center of the club body to the surface of the club body. The body will remain in the bath for 40 to 60 minutes. The body is then extracted from the bath, and is buffed and polished.

Examples of molds used to produce the club body 2 are shown in FIGS. 5–8. The overall mold 7 consists of two separable parts 8 and 9. The mold 7 is provided with cooling lines drilled straight through each of the sides 8 and 9, with a 0.125" offset of the holes facing each other in each side 8 and 9, so as to produce turbulence. The coolant flowing in the respective cooling lines controls the temperature in a zone surrounding each cooling line. The coolant is not circulated through all the lines together, but instead each line forms its own closed loop, so that each line can be individually controlled with a temperature controller (not separately shown) connected to each of the cooling lines. Oil at 170°–220° F. is suitable as the coolant.

The mold 7 has a cold runner 10 with a cold slug 11 and a cold gate 18, and a sprue bushing 39 in which the hot tip gate (not shown) will be disposed. Examples of placement of the cooling lines in the mold part 8 are as follows. The cooling line 12 can be placed 0.6000" measured perpendicularly from the surface 8a of the part 8, and 5.875" from a plane extending through the center line of the cold slug 11 perpendicular to the mold seam between the parts 8 and 9. The cooling line 14 may be 1.4" from the surface 8a and 4.950 from the cold slug plane. The cooling line 15 may be 2.000" from the surface 8a and 4.125" from the cold slug plane. The cooling line 15 may 2.450" from the surface 8a and 3.125" from the cold slug plane. The cooling lines 16 and 17 may each be 0.875" from the surface 8b of the part 8, and disposed at 1.000" on opposite sides of the cold slug plane. The associated cooling lines 19, 20, 21, 22, 23 and 24 in the part 9 will be disposed at the same distances from the surfaces 8a and 8b as the aforementioned lines, but each will be offset from the facing cooling line by 0.125" so that, for example, the cooling line 19 may be at 6.000" from the cold slug plane, the cooling line 20 may be 5.075" from the cold slug plane, etc. The center lines of the cooling lines 25 through 30 in the lower portion of the part 8 may be disposed at the following locations. The cooling line 25 may be disposed at a distance of 1.600" from a plane containing the surface 8c and 5.750" from the cold slug plane. The cooling line 26 may be disposed at a distance of 2.600" from the plane containing the surface 8c and 4.750" from the cold slug plane. The cooling line 27 may be disposed also at 2.600" from the plane containing the surface 8c and 3.375" from the cold slug plane. The cooling line 28 can be disposed 2.000" from the plane containing the surface 8c and 2.125" from the cold slug plane. The cooling line 29 can be disposed 1.100" from the plane containing the surface 8c and 1.125" from the cold slug plane. The cooling line 30 can also be disposed 1.100" from the plane containing the surface 8c, and at 1.190" on the opposite side of the cold slug plane. The cooling lines 31, 32, 33, 34 and 35 in the part 9 will be disposed at the same distances from the plane containing the surface 8c, but offset from the facing cooling line by 0.125".

The tool will be equipped with a hot tip gate (not separately shown). The gate size must be in excess of 0.25" in hydraulic diameter to provide good flow through the gate for an adequate period of time before freeze-off occurs.

Processing conditions must be tightly controlled so as not to create excessive head in the cavity. The following processing parameters are preferable.

Figure 3:
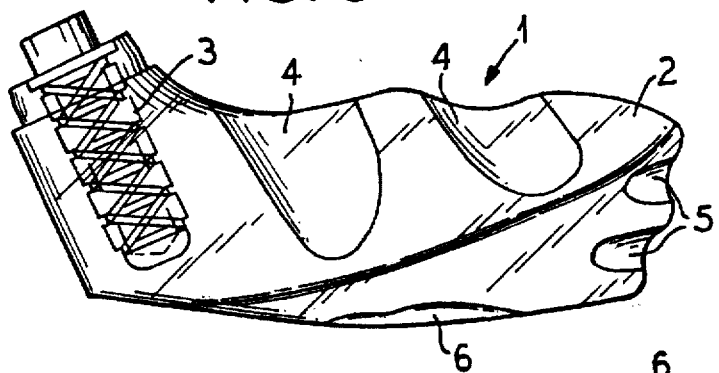
FIG. 3 is a rear elevational view of the club head of FIG. 1.
Figure 4:
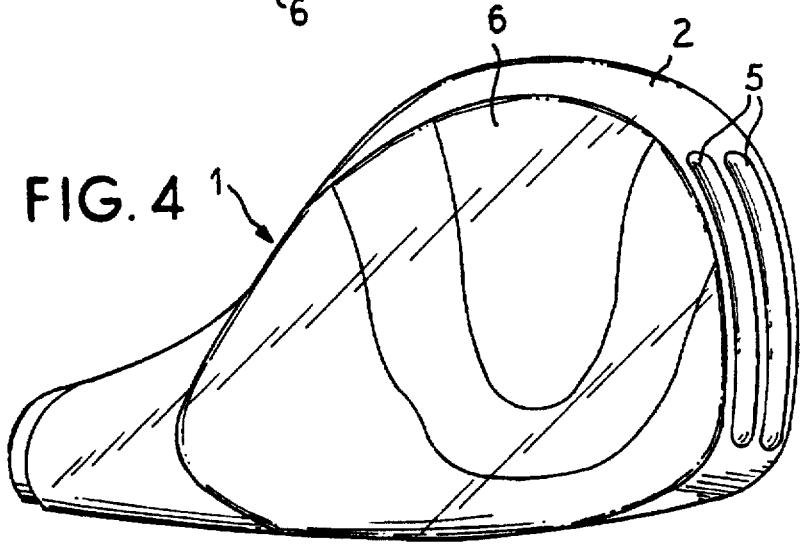
FIG. 4 is a bottom view of the club head of FIG. 1.
Figure 6:
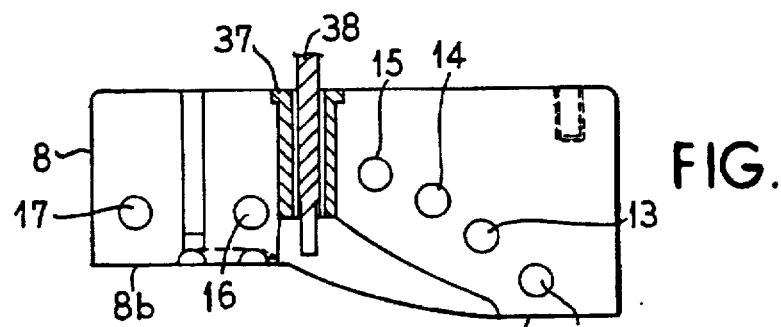
FIG. 6 is a side elevational view of one portion of the mold of FIG. 5.
Figure 5:
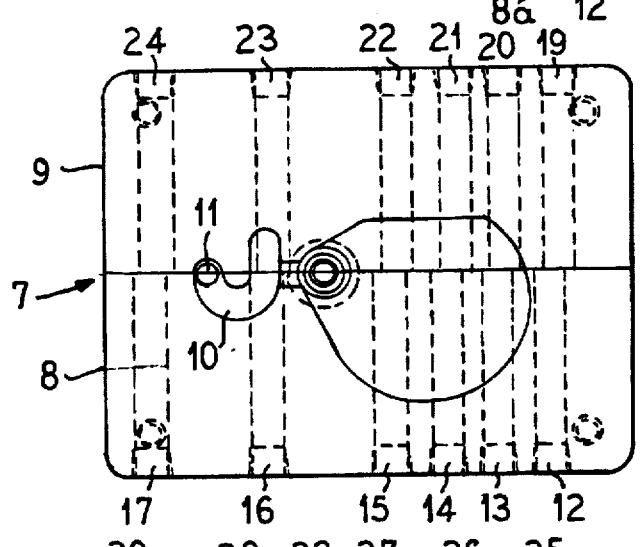
FIG. 5 is a top view of a mold for making a club head in accordance with the principles of the present invention by an injection molding process.
Figure 7:
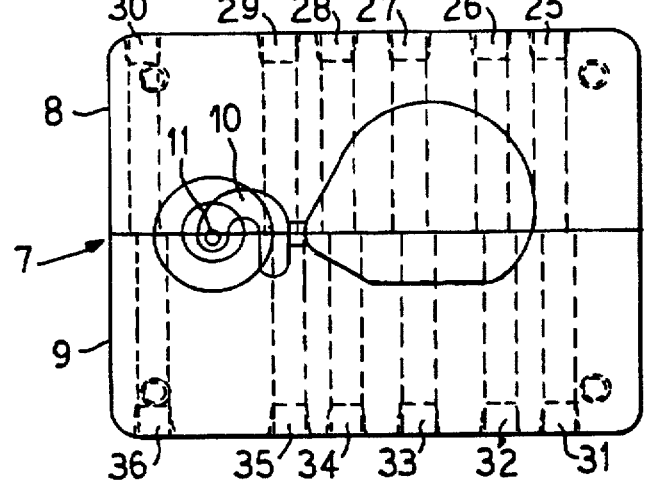
FIG. 7 is a bottom view of the mold of FIG. 5.
Figure 8:
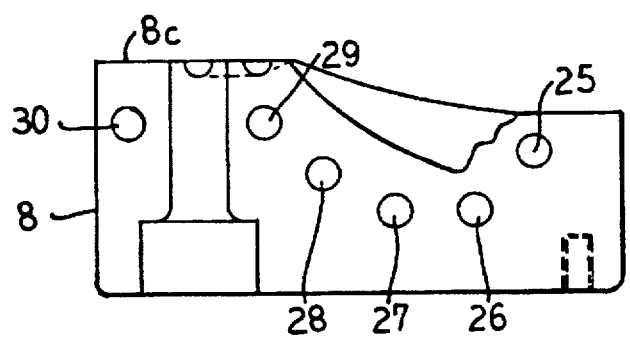
FIG. 8 is a side elevational view of a portion of the mold of FIG. 7.

Injection Temperature: 380°–410° F.
Mold Temperature: 180°–220° F.
Oil Coolant in Tool: 190°–220° F.
Water Temperature (bath): 180°–200° F.
Injection Time: 15–35 seconds As shown in FIG. 6, the mold 7 is provided with a sleeve 37 which, during the injection molding process, receives a steel post 38 on which the insert or bushing 3 will be placed prior to each filling of the mold 7. The insert 3 is held in place within the cavity during the molding process by the post 38. The insert must be heated to 500° F. to prevent cold shock of hot plastic. The acrylic flows around the insert 3 to hold it in place in the finished product. As can be seen in FIG. 3, the insert 3 is provided at its exterior with a plurality of channels, and a suitable knurling such as a criss-cross pattern of ridges is arranged in those channels, around which the molten acrylic flows, and subsequently hardens to hold the insert in place in the club body 2.

Although modifications and changes may be suggested by those skilled in the art, it is the intention of the inventors to embody within the patent warranted hereon all changes and modifications as reasonably and properly come within the scope of their contribution to the art.

I claim as our invention:

1. A method for injection molding a golf club body comprising the steps of:

filling a mold cavity with polymethylmethacrylate;

varying pressure acting on said polymethylmethacrylate in said cavity during filling of said cavity until reaching a first pressure;

holding said polymethylmethacrylate in said cavity at a second pressure higher than said first pressure for a period of approximately 3–4 minutes;

providing a selected temperature profile in said mold surrounding said cavity during holding of said polymethylmethacrylate in said cavity at said second pressure;

cooling said polymethylmethacrylate in said cavity for a period of approximately 4–5 minutes;

ejecting said polymethylmethacrylate from said cavity in the form of a molded body; and cooling said molded body in a hot oil bath at 180°–200° F. after ejection for a period in the range of 20 to 40 minutes to produce a golf club body consisting entirely of a solid mass of polymethylmethacrylate.

2. A method as claimed in claim 1 wherein the step of varying pressure during filling of said cavity with said polymethylmethacrylate is further defined by increasing pressure to 30% of said first pressure during 0–50% of filling of said cavity, and increasing said pressure to 80% pressure from 50 to 80% of filling of said cavity.

3. A method as claimed in claim 2 wherein the step of filling said cavity with polymethylmethacrylate is further defined by filling said cavity with polymethylmethacrylate during a period in the range of 15 to 35 seconds.

4. A method as claimed in claim 1 wherein the step of providing a selected temperature profile in said mold surrounding said cavity is further defined by arranging a plurality of cooling lines in said mold around said cavity at selected locations and controlling a flow of coolant through said cooling lines during holding of said polymethylmethacrylate in said cavity and during cooling of said polymethylmethacrylate in said mold and cooling said molded body in a cooling bath after ejection for a period in the range of 20 to 40 minutes to produce a golf club body consisting entirely of a solid mass of polymethylmethacrylate.

5. A method as claimed in claim 1 wherein said first pressure is in a range of 900–1200 psi and said second pressure is in a range of 900–2000 psi.

6. A method for injection molding a golf club body comprising the steps of:

filling a mold cavity with polymethylmethacrylate;

varying pressure acting on said polymethylmethacrylate in said cavity during filling of said cavity until reaching a first pressure by increasing pressure to 30% of said first pressure during 0–50% of filling of said cavity and increasing said pressure to 80% pressure from 50 to 80% of filling of said cavity;

holding said polymethylmethacrylate in said cavity at a second pressure higher than said first pressure for a period of approximately 3–4 minutes;

providing a selected temperature profile in said mold surrounding said cavity during holding of said polymethylmethacrylate in said cavity at said second pressure;

cooling said polymethylmethacrylate in said cavity for a period of approximately 4–5 minutes;

ejecting said polymethylmethacrylate from said cavity in the form of a molded body; and cooling said molded body in a cooling bath after ejection for a period in the range of 20 to 40 minutes to produce a golf club body consisting entirely of a solid mass of polymethylmethacrylate.

7. A method as claimed in claim 6 wherein the step of filling said cavity with polymethylmethacrylate is further defined by filling said cavity with polymethylmethacrylate during a period in the range of 15 to 35 seconds.

8. A method as claimed in claim 6 wherein the step of cooling said molded body in a bath after ejection is further defined by cooling said molded body in a water bath at 180°–200° F.

9. A method as claimed in claim 6 wherein the step of cooling said molded body in a bath after ejection is further defined by cooling said molded body in a hot oil bath at 180°–200° F.

10. A method as claimed in claim 6 wherein the step of providing a selected temperature profile in said mold surrounding said cavity is further defined by arranging a plurality of cooling lines in said mold around said cavity at selected locations and controlling a flow of coolant through said cooling lines during holding of said polymethylmethacrylate in said cavity and during cooling of said polymethylmethacrylate in said mold.

11. A method as claimed in claim 6 wherein said first pressure is in a range of 900–1200 psi and said second pressure is in a range of 900–2000 psi.

12. A method for injection molding a golf club body comprising the steps of:

filling a mold cavity with polymethylmethacrylate;

varying a pressure acting on said polymethylmethacrylate in said cavity during filling of said cavity until reaching a first pressure in a range of 900–1200 psi;

holding said polymethylmethacrylate in said cavity at a second pressure in a range of 900–2000 psi for a period of approximately 3–4 minutes;

providing a selected temperature profile in said mold surrounding said cavity during holding of said polymethylmethacrylate in said cavity at said second pressure;

cooling said polymethylmethacrylate in said cavity for a period of approximately 4–5 minutes;

ejecting said polymethylmethacrylate from said cavity in the form of a molded body; and cooling said molded body in a cooling bath after ejection for a period in the range of 20 to 40 minutes to produce a golf club body consisting entirely of a solid mass of polymethylmethacrylate.

13. A method as claimed in claim 12 wherein the step of cooling said molded body in a bath after ejection is further defined by cooling said molded body in a water bath at 180°–200° F.

14. A method as claimed in claim 12 wherein the step of cooling said molded body in a bath after ejection is further defined by cooling said molded body in a hot oil bath at 180°–200° F.

15. A method as claimed in claim 12 wherein the step of varying pressure during filling of said cavity with said polymethylmethacrylate is further defined by increasing pressure to 30% of said first pressure during 0–50% of filling of said cavity, and increasing said pressure to 80% pressure from 50 to 80% of filling of said cavity.

16. A method as claimed in claim 15 wherein the step of filling said cavity with polymethylmethacrylate is further defined by filling said cavity with polymethylmethacrylate during a period in the range of 15 to 35 seconds.

* * * * *